US011875910B2

(12) United States Patent
Graves

(10) Patent No.: US 11,875,910 B2
(45) Date of Patent: Jan. 16, 2024

(54) OFF-AXIS CAPILLARY X-RAY OPTICS

(71) Applicant: Arizona Board of Regents on Behalf Of Arizona State University, Scottsdale, AZ (US)

(72) Inventor: William Graves, Tempe, AZ (US)

(73) Assignee: Arizona Board of Regents on Behalf of Arizona State University, Scottsdale, AZ (US)

( * ) Notice: Subject to any disclaimer, the term of this patent is extended or adjusted under 35 U.S.C. 154(b) by 324 days.

(21) Appl. No.: 17/350,464

(22) Filed: Jun. 17, 2021

(65) Prior Publication Data

US 2021/0313085 A1 Oct. 7, 2021

Related U.S. Application Data

(63) Continuation of application No. PCT/US2019/067670, filed on Dec. 19, 2019.

(60) Provisional application No. 62/783,000, filed on Dec. 20, 2018.

(51) Int. Cl.
*G21K 1/06* (2006.01)

(52) U.S. Cl.
CPC ......... *G21K 1/06* (2013.01); *G21K 2201/064* (2013.01); *G21K 2201/067* (2013.01)

(58) Field of Classification Search
None
See application file for complete search history.

(56) References Cited

U.S. PATENT DOCUMENTS

| | | | | |
|---|---|---|---|---|
| 2009/0161829 | A1 | 6/2009 | Chen et al. | |
| 2011/0085644 | A1 | 4/2011 | Verman et al. | |
| 2011/0206187 | A1* | 8/2011 | Lee | G21K 1/062 378/119 |
| 2014/0376699 | A1 | 12/2014 | Komoto et al. | |
| 2019/0369272 | A1* | 12/2019 | Yun | G01T 1/36 |
| 2020/0098537 | A1* | 3/2020 | Yun | H01J 35/066 |

FOREIGN PATENT DOCUMENTS

| | | |
|---|---|---|
| JP | 2003149392 A | 5/2003 |

OTHER PUBLICATIONS

Arizona Board of Regents on Behalf of Arizona State University, EP19901150, Extended Search Report, dated Aug. 10, 2022, 4 pages.
Arizona Board of Regents on Behalf of Arizona State University, PCT/USZO19/067670, International Search Report and Written Opinion, dated Mar. 19, 2020, 8 pages.
Arizona Board of Regents on Behalf of Arizona State University, PCT/US2019/067670, International Preliminary Report on Patentability, dated Jun. 16, 2021, 8 pages.

(Continued)

*Primary Examiner* — Hoon K Song
(74) *Attorney, Agent, or Firm* — Morgan, Lewis & Bockius LLP

(57) ABSTRACT

An optical apparatus is provided for manipulating light from x-ray sources (e.g., free electron lasers). In some embodiments, the optical apparatus includes a first capillary optic having a first longitudinal axis and a second capillary optic having a second longitudinal axis that is angled with respect to the first longitudinal axis. The second capillary optic is positioned to receive light directly from the first capillary optic.

19 Claims, 3 Drawing Sheets

(56) References Cited

OTHER PUBLICATIONS

Sun et al., "Combined optic system based on polycapillary X-ray optics and single-bounce monocapillary optics for focusing X-rays from a conventional laboratory X-ray source", Nuclear Instruments and Methods in Physics Research A 802 (2015) 5-9, Article history: Received Apr. 27, 2015, Received in revised form, Jul. 25, 2015, Accepted Aug. 18, 2015, ELSEVIER, 6 pgs.

Bilderback et al., "Microbeam generation with capillary optics." Review of Scientific Instruments 66, 2059 (1995), https://doi.org/10.1063/11145727 Published Online: Jun. 4, 1998, 6 pgs.

Muradin A. Kumakhov, "X-ray capillary optics: history of development and present status," Proc. SPIE 4155, Kumakhov Optics and Application, Kumakhov Optics and Applications, 2000, n/a, Russian Federation, Institute for Roentgen Optics, 1 Volokolamskii pr.10, 123060 Moscow, Russia, (Jun. 8, 2000); doi: 10.1117/12.387859, 12 pgs.

Muradin A. Kumakhov, "Status of X-ray capillary optics," Proc. SPIE 2515, X-Ray and Extreme Ultraviolet Optics, SPIE's 1995 International Symposium on Optical Science, Engineering, and Instrumentation, 1995, San Diego, CA, (Jun. 20, 1995), doi: 10.1117/12.212579, 18 pgs.

Bjeoumikhova et al., "Capillary Optics for X-Rays", In: Erko, A., Idir, M., Krist, T., Michette, A.G. (eds) Modern Developments in X-Ray and Neutron Optics. Springer Series in optical science, vol. 137. Springer, Berlin, Heidelberg. https://doi.org/10.1007/978-3-540-74561-7_18, 20 pgs.

* cited by examiner

OFF-AXIS CAPILLARY X-RAY OPTICS

CROSS REFERENCE TO RELATED APPLICATION

The present application is a continuation of PCT Application PCT/US19/67670, filed Dec. 19, 2019, which claims priority to U.S. Provisional Patent Application No. 62/783,000, filed Dec. 20, 2018, each of which is hereby incorporated by reference.

TECHNICAL FIELD

The disclosed embodiments relate generally to x-ray optics (e.g., for collimating and focusing x-ray beams), and more specifically to capillary x-ray optics that are oriented at an angle to an optical axis of an incoming x-ray beam.

BACKGROUND

X-ray optics are important in matching the output properties of different x-ray sources (e.g., laboratory tubes, inverse Compton scattering, x-ray free electron lasers, and synchrotrons) to a wide variety of scientific experiments, such as molecular crystallography (MX), critical-dimension small angle x-ray scattering (CDSAXS) for semiconductor metrology, solution small angle scattering (SAXS), phase contrast medical imaging (PCI), x-ray emission spectroscopy (XES), and x-ray absorption spectroscopy (XAS). These different sources and different experimental techniques require different types of optics to properly relay and/or transform the beam from the source to the experimental sample, such that the beam has desired properties at an experimental sample. The optics affect the photon energy, frequency bandwidth, transverse size, and transverse divergence of the x-ray beam.

SUMMARY

In one aspect, an optical apparatus includes a first capillary optic having a first longitudinal axis and a first focal length; and a second capillary optic positioned relative to the first capillary optic to receive light directly reflected from the first capillary optic. The second capillary optic has a second focal length, the second capillary optic has a second longitudinal axis that is angled with respect to the first longitudinal axis.

In some embodiments, the optical apparatus includes an x-ray source configure to emit x-ray light along an optical axis. The x-ray light emitted from the x-ray source has a first beam divergence, and the optical axis is angled with respect to the first longitudinal axis of the first capillary optic. In some embodiments, the x-ray source is positioned at a focus of the first capillary optic. In some embodiments, the optical axis is angled with respect to the second longitudinal axis of the second capillary optic. In some embodiments, the optical axis is angled with respect to the first longitudinal axis by less than 1 degree. In some embodiments, the optical axis of the x-ray source intersects a reflective surface of the first capillary optic. In some embodiments, the reflective surface includes a metal-coated reflective surface configured to reflect x-ray light having a first energy incident on the metal-coated reflective surface at a first angle, and to reflect x-ray light having a second energy incident on the metal-coated reflective surface at a second angle, different from the first angle.

In some embodiments, the first capillary optic is configured to receive the x-ray light having the first beam divergence at a first grazing incidence angle and direct the x-ray light as a substantially collimated beam toward a reflective surface of the second capillary optic. In some embodiments, the second capillary optic is configured to focus the substantially collimated beam onto a sample. In some embodiments, the first capillary optic has a first entrance aperture and x-ray light within a first bandwidth enters the first capillary optic through the first entrance aperture. In some embodiments, the first focal length and the second focal length are different.

In some embodiments, the first beam divergence is greater than 8 mrad.

In some embodiments, the second longitudinal axis is angled with respect to the first longitudinal axis by less than 1 degree. In some embodiments, the first capillary optic and the second capillary optic are mono-capillary optics. In some embodiments, at least one of the first capillary optic or the second capillary optic is a parabolic capillary optics.

In some embodiments, the parabolic capillary optic includes a portion of a figure of rotation of a parabolic curve. In some embodiments, the light is x-ray light. In some embodiments, the x-ray source is an inverse Compton scattering x-ray source. In some embodiments, the x-ray source is a free electron laser.

In another aspect, an optical apparatus includes a first reflective optical element; and a second reflective optical element positioned relative to the first reflective optical element to receive x-ray light that has reflected once off the first reflective optical element. The second reflective optical element is configured to direct the x-ray light onto a sample after a single reflection off the second reflective optical element.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

DESCRIPTION OF EMBODIMENTS

Figure 1A:
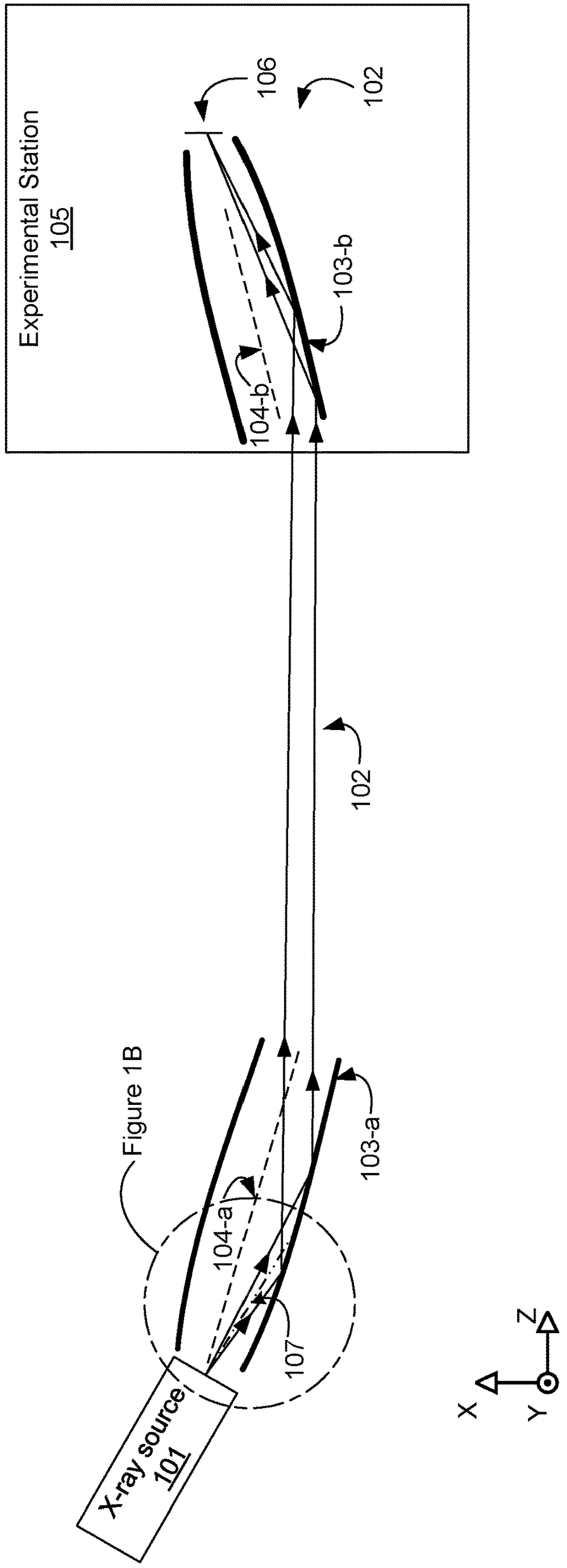
FIG. 1A is a schematic diagram illustrating an experimental x-ray setup, according to some embodiments.

In some embodiments of the present disclosure, a monocapillary optic (MCO) includes a glass substrate having an interior surface (e.g., wall) that defines a figure of rotation with a parabolic or elliptical radial variation along a longitudinal axis. In the case of an ellipsoidal MCO, which has two foci, when the MCO is placed so that an x-ray source is located at one focus of the ellipse, rays from the x-ray source reflect from the MCO surface to form a spot with unity magnification at the other focus. The foci are typically located between a few centimeters and a few meters apart.

In contrast, a parabolic MCO has a single focus. When a parabolic MCO is placed so that the x-ray source is at the focus, the rays that reflect from the MCO surface emerge parallel to the MCO longitudinal axis, forming a collimated beam. In some circumstances, a parabolic MCO is used in the reverse sense, where a collimated input x-ray beam is focused to a spot at the focus of the parabolic MCO. In some embodiments, the surface of the MCO is coated with metal or dielectric coatings to increase their reflectivity at x-ray wavelengths. In some embodiments, one or more layers of coatings is disposed on the surface of the MCO.

X-rays interact rather weakly with matter (e.g. absorption lengths are on the order of millimeters); x-ray refractive indices are thus extremely close to 1. In fact, x-ray refractive indices tend to be slightly smaller than 1, giving rise to total external reflection at sufficiently small angle. This can be compared to total internal reflection typically observed for visible light. Thus, reflecting x-ray beams at grazing incidence angles (e.g., typically less than a few degrees) allows a larger portion of x-ray beams to be reflected, increasing the efficiency of the reflection. Total external reflection occurs when an x-ray beam starts in air or vacuum (e.g., refractive index 1), and reflects off a material with index of refraction less than 1. The refractive index for x-ray beams is frequently only slightly less than 1, allowing total external reflection to occur at glancing angles. The phenomenon is termed "total external reflection" because the light bounces off an exterior of the reflecting material.

For a beam that is nearly parallel to a surface, referring to the angle between the beam and the surface, rather than that between the beam and the surface normal is more useful. This small angle is called a glancing angle or grazing angle. Incidence at grazing angles is called "grazing incidence." Glancing angle is the angle formed by the incident ray or the reflected ray and the plane (surface). For x-ray beams, the critical angle is a glancing angle or grazing angle of typically about 1°, depending on the wavelength of the x-ray beam. X-ray beams having incidence angles smaller than the critical angle undergo total external reflection. To support reflections at glancing angles, MCOs are typically long and thin like a drinking straw.

In some embodiments, the MCOs described herein are metal-coated. In some embodiments, the MCOs have wideband coatings. In some embodiments, the wideband coatings include 10 or 20 nm of boron carbide ($B_4C$) over 50 nm of tungsten (W). In some embodiments, the wideband coatings include about 5-10 nm of nickel oxide ($NiO_2$) over 50 nm of tungsten (W). In some embodiments, the wideband coatings include about 5 nm of nickel oxide ($NiO_2$) over 50 nm of tungsten (W). In some embodiments, the wideband coatings include about 10 nm of nickel oxide ($NiO_2$) over 50 nm of tungsten (W). In some embodiments, a surface roughness of the wideband coating is 0.3 nm. In some embodiments, a figure error of the substrate is about 1 nm RMS.

In some embodiments, the MCOs have narrowband coatings. In some embodiments, the MCOs described herein can be widely tuned to different photon energies (e.g., ranging from approximately 1 keV to 22 keV depending on the grazing angle).

As described below, some embodiments of the present disclosure use MCOs arranged off axis to focus and/or collomate light from Inverse Compton scattering sources. Inverse Compton scattering produces x-ray beams in which shorter wavelength x-ray beams have smaller emission angles. The bandwidth of x-ray beams can thus be controlled by limiting the entrance aperture. In some embodiments, decreasing the entrance aperture prevents x-rays having longer wavelengths (and larger emission angle) from entering the MCO, allowing the bandwidth of the x-ray beams to be restricted downstream of the MCO.

Importantly, the x-ray beam reflects once at each MCO, in contrast to Kirkpatrick-Baez (KB) or Montel mirrors that require multiple reflections, reducing efficiency. MCOs are also achromatic, efficiently focusing a wide range of photon energies in contrast to Fresnel zone plates (FZPs) and compound refractive lenses (CRLs), which are highly chromatic, thus limited in their tunability.

The MCOs described herein can be configured to work with x-ray beams ranging from approximately 1 keV to 22 keV depending on the grazing angle. Besides selecting an entrance aperture to control a bandwidth of the x-ray beams that are reflected, other characteristics of MCOs can be adjusted to match specific characteristics of the x-ray source 101 (FIG. 1A). A length of an MCO (e.g., along the z-direction, as labeled in FIG. 1A) can be selected to limit the amount of x-ray beam that is reflected. A surface roughness of the MCO's reflective surfaces can also control the amount of x-ray beam that is reflected by the MCO. In some embodiments, a surface roughness of one or both of the first capillary optic 103-*a*, and the second capillary optic 103-*b* is less than 0.4 nm.

A mirror figure error, defined as the height difference function between the actual mirror surface and the ideal parabolic (or elliptical profile), causes a perturbation of an x-ray wavefront for x-rays reflecting from the mirror. In some embodiments, the mirror figure error for the first capillary optic 103-*a* and the second capillary optic 103-*b* is less than 1.5 nm RMS (root mean square).

Thus, in accordance with various embodiments, the MCOs described herein provide control of the photon energy, bandwidth, focus size, and beam divergence for certain x-ray sources.

FIG. 1A is a schematic diagram illustrating an experimental x-ray setup 100, according to some embodiments. The x-ray setup 100 includes an x-ray source 101, a first capillary optic 103-*a* having a first longitudinal axis 104-*a*, and a second capillary optic 103-*b* having a second longitudinal axis 104-*b*. During operation of the x-ray setup 100, the x-ray source 101 produces an x-ray beam 102. In some embodiments, an experimental station (e.g., a hutch) 105 houses a sample 106 (e.g., a scientific sample) that is probed by the x-ray beam 102. FIG. 1A is not drawn to scale. For example, the first capillary optic 103-*a* and the second capillary optic 103-*b* are typically only about 10 cm in length, and are typically separated by a few meters. In addition, for visual clarity, the angles shown in FIG. 1A are greatly enlarged.

Figure 1B:
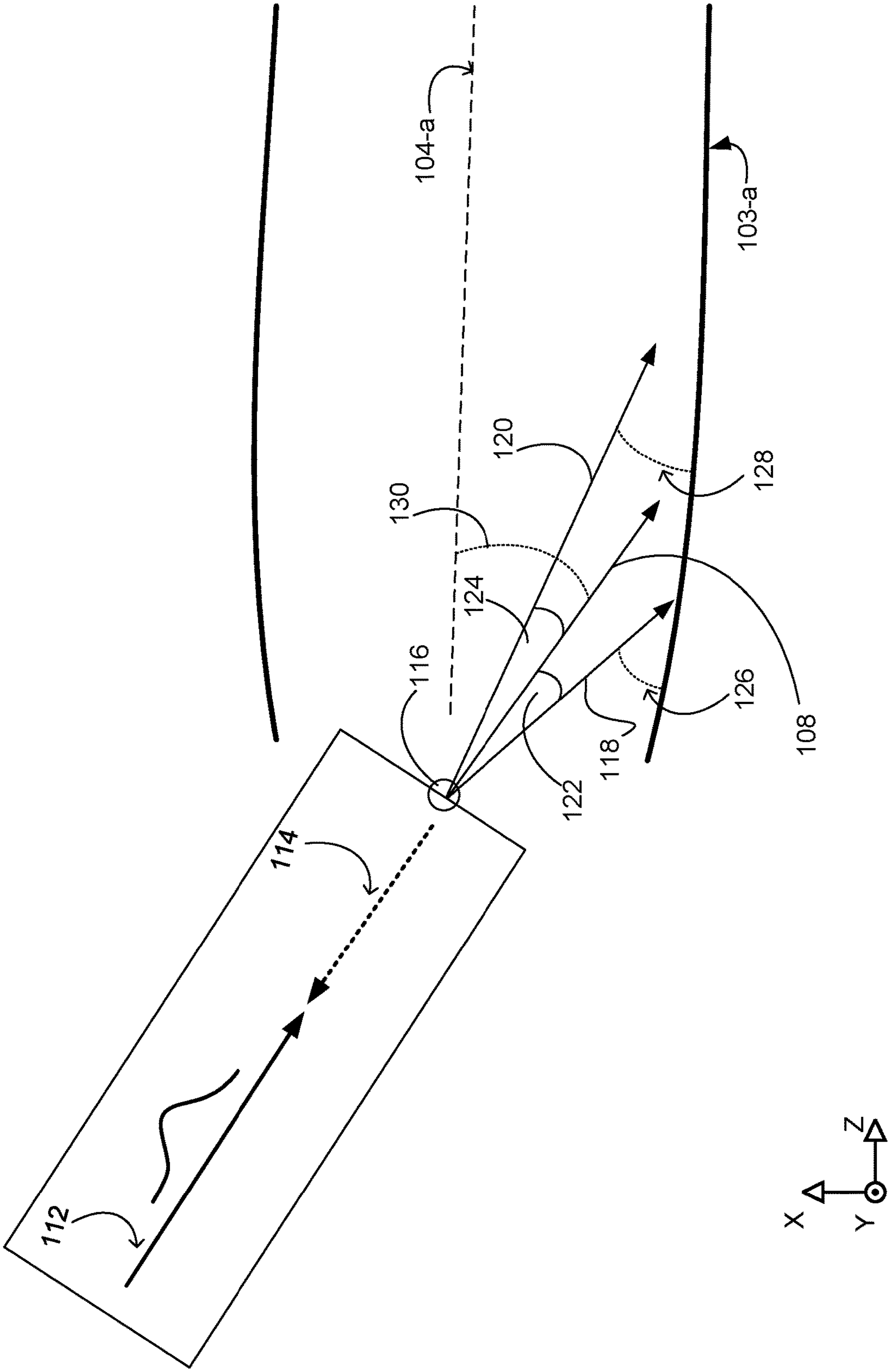
FIG. 1B is an expanded view of a portion of FIG. 1A.

FIG. 1B shows an expanded view of a portion of FIG. 1A that is marked with a circle. In some embodiments, the x-ray source 101 is an inverse Compton scattering (ICS) x-ray source. An inverse Compton scattering source scatters relativistic electrons 112 off of low energy photons 114, which produces x-ray light. Here, the term "low energy photons" means photons having a lower frequency than the x-ray light produced by x-ray source 101. For example, x-ray source 101 may use an optical wavelength or UV-wavelength laser to scatter optical or UV photons off of the relativistic electrons. X-rays are emitted in a direction tangential to a path of the relativistic electrons 112 at a location 116. In some embodiments, the location 116 coincides with a focus of the parabolic first capillary optic 103-*a*. In some embodiments, the x-ray source emits over a smaller spot, and there is a larger spread of angles of the emitted x-ray beams. In some embodiments, spot sizes of the source are between 1 micron to 20 microns.

FIG. 1B shows a central ray 108 of the x-ray light being collinear with the optical axis 107 (shown in FIG. 1A) of the x-ray source 101. A beam 118 makes an angle 122 from the central ray 108, and a beam 120 makes an angle 124 from the central ray 108. In some embodiments, the angle 122 is identical to the angle 124 and the two beams 118 and 120 are symmetrically disposed with respect to the central ray 108. In some embodiments, the beams 118 and 120 have a moderate beam divergence (e.g., between 8 mrad and 12 mrad).

In some embodiments, the first capillary optic 103-*a* is paired with a particular x-ray source, and only the second capillary optic 103-*b* is changed between different experimental settings.

In some embodiments, the first capillary optic 103-*a* receives beam 118, which impinges on the first capillary optic 103-*a* at a first grazing incidence angle 126. The size of the first grazing incidence angle 126 is enlarged for visual clarity in FIG. 1B. The first grazing incidence angle 126 is typically less than a few degrees. The first capillary optic 103-*a* also receives beam 120, which impinges on the first capillary optic 103-*a* at a second grazing incidence angle 128. The size of the second grazing incidence angle 128 is also enlarged for visual clarity, the second grazing incidence angle 128 is typically less than a few degrees.

An angle 130 denotes the angle made by the longitudinal axis 104-*a* of the first capillary optic 103-*a* and the central ray 108 of the x-ray source 101. The angle 130 is equivalent to the angle made by the longitudinal axis 104-*a* and the optical axis 107 of the x-ray source 101. The size of angle 130 is greatly enlarged for visual clarity. In some embodiments, the angle 130 is less than one degree.

In some embodiments, x-ray source 101 is an inverse Compton scattering free-electron laser. In some embodiments, the x-ray source 101 is a source that produces light with its highest intensity along an optical axis 107 of the x-ray source 101. In some embodiments, x-ray source 101 is a free-electron laser.

In some embodiments, the second capillary optic 103-*b* receives light directly from the first capillary optic 103-*a* (e.g., without any intervening optics that change the direction of propagation of the light). In some embodiments, the x-ray beam 102 that impinges on the sample 106 has undergone a single reflection at the second capillary optic 103-*b* and a single reflection at the first capillary optic 103-*a*, without any intervening optics between the first capillary optic 103-*a* and the second capillary optic 103-*b*.

In some embodiments, the first capillary optic 103-*a* and the second capillary optic 103-*b* are both parabolic mono-capillary optics (MCOs). Parabolic mono-capillary optics are x-ray optics that can be used to collimate an x-ray beam (e.g., in the case of optic 103-*a*) and/or focus a collimated x-ray beam to a small spot (e.g., in the case of optic 103-*b*). In some embodiments, a divergent x-ray source (e.g., a point source) is placed at the focus of a first parabolic mono-capillary optic (e.g., the first capillary optic 103-*a*) to produce a collimated x-ray beam after a single reflection at the parabolic mono-capillary optic. In some embodiments, a sample is placed at the focus of a second parabolic mono-capillary optic (e.g., the second capillary optic 103-*b*) so that the collimated x-ray beam received by the second parabolic mono-capillary reflects once at the second parabolic mono-capillary and is focused at the sample.

In some circumstances (not shown), for tubes and synchrotrons, parabolic MCOs are used in a configuration where the capillary axis (e.g., the first longitudinal axis 104-, the second longitudinal axis 104-*b*) aligns with (e.g., is collinear to) the optical axis 107 (e.g., the central ray) of the x-ray beam. In this configuration, the central ray propagates through the capillary optic without impinging on (e.g., reflecting off) any portion of the surface of the capillary optic, and the x-ray beam is not focused. For x-ray sources that produce their most intense beam on-axis, it is advantageous to be able to use one or more x-ray optical elements to capture both the central ray and a moderate beam divergence (e.g., between 8 mrad and 12 mrad) in order to preserve the flux of x-ray photons emitted by the x-ray sources. The flux of x-ray photons can then be delivered to the experimental samples. Thus, in some embodiments of the present disclosure, rather than aligning the optical axis 107 of the x-ray source 101 with the longitudinal axes of optics 103-*a* and 103-*b*, the longitudinal axis of optic 103-*a* is angled with respect to the optical axis 107 of the x-ray source 101.

In some embodiments, the longitudinal axis of optic 103-*a* is angled with respect to the optical axis of the x-ray source 101 so that essentially all of the x-rays are incident upon optic 103-*a*'s surface (e.g., greater than 90% of the incident power is incident upon the MCOs surface), increasing the efficiency and effectiveness of the MCO.

In accordance with some embodiments, a first capillary optic 103-*a* is positioned with x-ray source 101 at its focus. In some embodiments, first capillary optic 103-*a* is a collimating MCO that collimates an x-ray beam produced by the x-ray source 101. The first capillary optic 103-*a* has a first longitudinal axis 104-*a* that is angled with respect to an optical axis 107 of the x-ray source 101 (e.g., by less than a degree). In some embodiments, the collimated beam 102 is focused to a small spot (e.g., on an experimental sample 106) downstream of the first capillary optic 103-*a*, by a second capillary optic 103-*b* (e.g., another parabolic MCO) having a second longitudinal axis 104-*b* that is angled with respect to the first longitudinal axis (of the first capillary optic 103-*a*) and the optical axis of the x-ray source 101. In some embodiments, each of the aforementioned angles is less than 1 degree. In some embodiments, the experimental sample 106 is positioned at the focus of the second capillary optic 103-*b*.

In some embodiments, the second capillary optic 103-*b* is positioned a few meters away from (e.g., downstream of) the first capillary optic 103-*a*. The second capillary optic 103-*b* focuses the collimated x-ray beam 102 to a focal size on the sample 106 that is determined by a focal length of the second capillary optic 103-*b*, which may differ from the focal length of the first capillary optic 103-*a*. In some embodiments, a ratio of the focal length of the first capillary optic 103-*a* to the focal length of the second capillary optic 103-*b* determines the magnification (e.g., demagnification) of the focused x-ray beam at the sample. In some embodiments, a focal length of the first capillary optic is between 50 mm to 500 mm. In some embodiments, a focal length of the second capillary optic is between 50 mm to 500 mm.

Figure 2B:
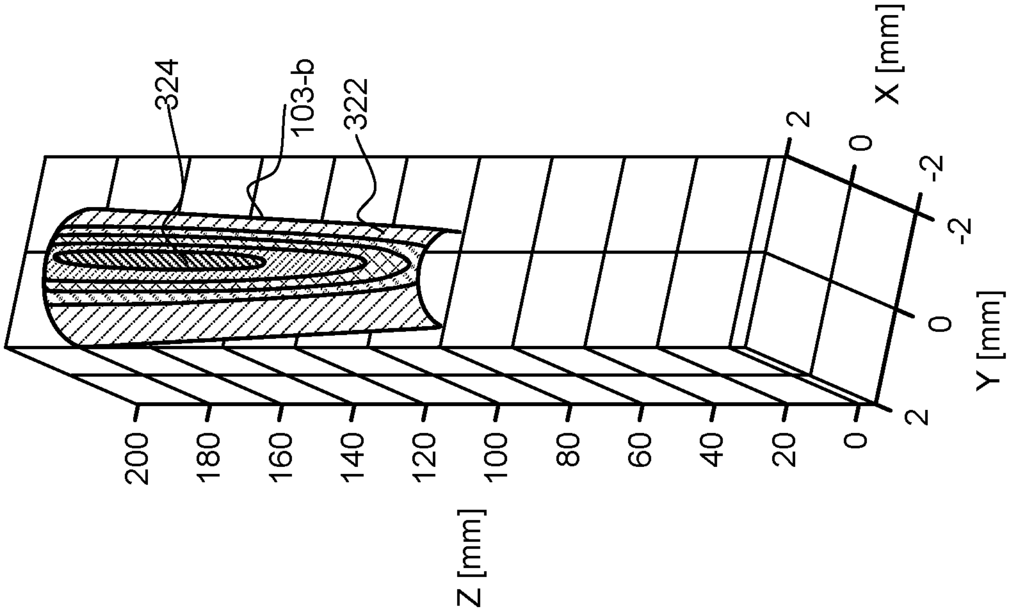
FIG. 2B illustrates a second capillary optic used in the experimental x-ray setup shown in FIG. 1A, in accordance with some embodiments.
Figure 2A:
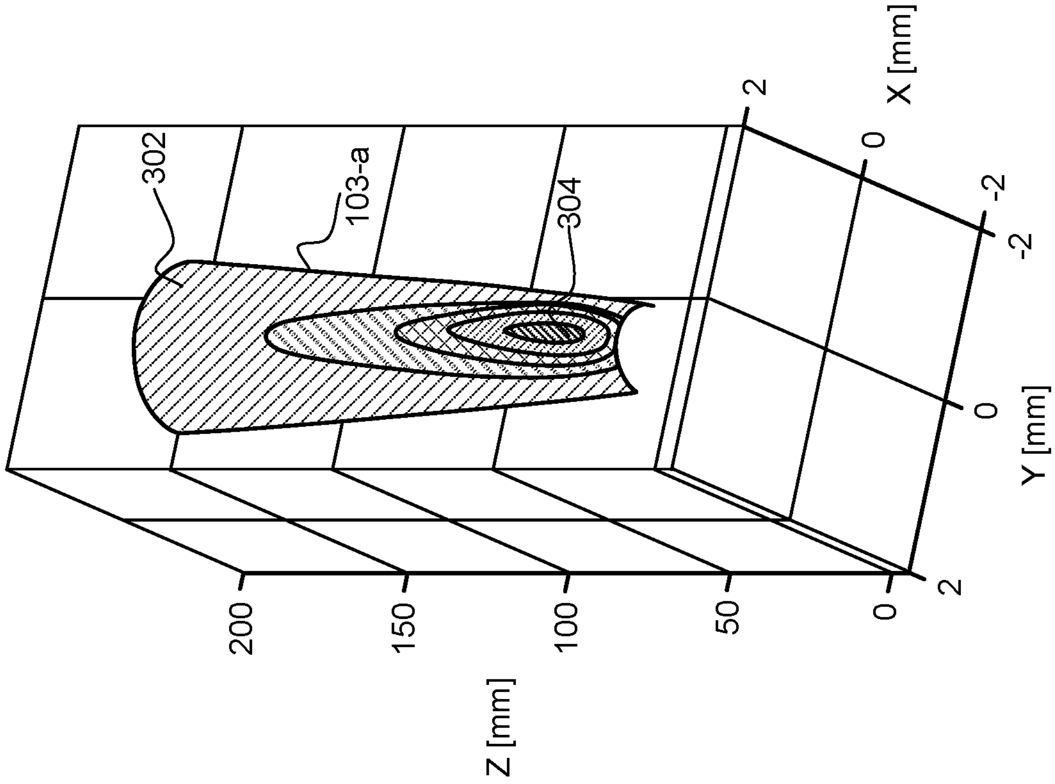
FIG. 2A illustrates a first capillary optic used in the experimental x-ray setup shown in FIG. 1A, in accordance with some embodiments.

FIG. 2A illustrates a first capillary optic (e.g., first capillary optic 103-*a*) and FIG. 2B illustrates a second capillary optic (e.g., second capillary optic 103-*b*) used in the experimental x-ray setup shown in FIG. 1A, in accordance with some embodiments. In FIGS. 2A and 2B, the contour plots on a respective optic correspond to the intensity of light incident on that location of the surface of the respective optic. As shown in FIG. 2A, in some embodiments, nearly the entire x-ray beam is incident on the surface of the first capillary optic 103-*a*.

FIG. 2A shows a region 302 containing a hatch pattern ("left hatch") depicting the region of the first capillary optic 103-*a* that is not substantially impinged upon by the x-ray beam. The central ray of the x-ray beam is incident on the surface of the first capillary optic 103-*a* and is shown in FIG. 2A as a region 304 having a dense hatch pattern ("dense right hatch") depicting the region of the first capillary optic 103-*a* that receives the highest intensity portion of the x-ray beam. The optical axis of the x-ray source (e.g., corresponding to the central ray of the x-ray beam) intersects a surface of the first capillary optic 103-*a*. In some embodiments, the central ray of the collimated x-ray beam 102, after reflecting off the first capillary optic 103-*a*, is incident on the surface of the second capillary optic 103-*b*. The region 304 appears asymmetric (e.g., oval-shaped) along the z-axis in FIG. 2A because of the tilting (or canting) of the longitudinal axis 104-*a* of the first capillary optic 103-*a* with respect to the optical axis 107 of the x-ray source 101.

FIG. 2B shows a region 322 containing a left hatch pattern depicting the region of the second capillary optic 103-*b* that is not impinged upon by the x-ray beam. The central ray of the x-ray beam is incident on the surface of the second capillary optic 103-*b* and is shown in FIG. 2B as a region 324 having a dense right hatch pattern depicting the region of the second capillary optic 103-*b* that receives the highest intensity portion of the x-ray beam. In some embodiments, the central ray of the collimated x-ray beam 102, after reflecting off the first capillary optic 103-*a*, is incident on the surface of the second capillary optic 103-*b*. For example, the central ray of the collimated x-ray beam 102 intersects a surface of the second capillary optic 103-*b*. In some embodiments, nearly the entire x-ray beam is incident on the surface of the second capillary optic 103-*b*.

Because the first capillary optic 103-*a* and the second capillary optic 103-*b* are canted with respect to a direction of propagation of x-ray beam 102, shorter portions of a capillary can be used for the first capillary optic 103-*a* and/or the second capillary optic 103-*b*. For example, in some embodiments, first capillary optic 103-*a* or the second capillary optic 103-*b* is less than 15 cm in length, less than 10 cm in length, or less than 8 cm in length. In some circumstances, optic 103-*a* and/or 103-*b* can be portions of the same capillary optics. In some embodiments, the capillary optic is manufactured and then cut into pieces for use as different optics.

In some embodiments, optics 103-*a* and 103-*b* need not be as long as they otherwise would have been in a configuration in which the central beam of the x-ray (e.g., the optical axis of the x-ray source) lies parallel to the longitudinal axis of a capillary optic. In some embodiments, the first capillary optic 103-*a* and the second capillary optic 103-*b* are formed from a larger capillary optic, e.g., by separating the larger capillary optic into two pieces.

In some embodiments, the capillary optic is defined by a figure of rotation. For an x-ray optical element having sufficient structural stability, instead of the capillary optic being formed of a figure of rotation spanning a full 360 degree revolution around the longitudinal axis of the capillary optic, in some embodiments, sections of the figure of rotation are used. For example, the capillary optic can be a parabolic "half-shell," spanning a 180 degree revolution around the longitudinal axis. In some embodiments, a single capillary optic is manufactured and then cut into halves along a plane containing the longitudinal axis of the capillary optic. In some embodiments, when the first and second capillary optics have the same focal length, the first half is used as the first capillary optic and the second half is used as the second capillary optic.

It will be understood that although the terms "first," "second," etc. may be used herein to describe various elements, these elements should not be limited by these terms. These terms are only used to distinguish one element from another. For example, a first widget could be termed a second widget, and, similarly, a second widget could be termed a first widget, without changing the meaning of the description, so long as all occurrences of the "first widget" are renamed consistently and all occurrences of the "second widget" are renamed consistently. The first widget and the second widget are both widgets, but they are not the same widget.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. An optical apparatus, comprising:

a first capillary optic having a first longitudinal axis and a first focal length; and a second capillary optic positioned relative to the first capillary optic to receive light directly reflected from the first capillary optic, the second capillary optic having a second focal length, the second capillary optic having a second longitudinal axis that is angled with respect to the first longitudinal axis.

2. The optical apparatus of claim 1, further including an x-ray source configure to emit x-ray light along an optical axis, wherein the x-ray light emitted from the x-ray source has a first beam divergence, and the optical axis is angled with respect to the first longitudinal axis of the first capillary optic.

3. The optical apparatus of claim 2, wherein the first beam divergence is greater than 8 mrad.

4. The optical apparatus of claim 2, wherein the x-ray source is an inverse Compton scattering x-ray source.

5. The optical apparatus of claim 2, wherein the x-ray source is a free electron laser.

6. The optical apparatus of claim 2, wherein the x-ray source is positioned at a focus of the first capillary optic.

7. The optical apparatus of claim 2, wherein the optical axis is angled with respect to the second longitudinal axis of the second capillary optic.

8. The optical apparatus of claim 2, wherein the optical axis is angled with respect to the first longitudinal axis by less than 1 degree.

9. The optical apparatus of claim 2, wherein the optical axis of the x-ray source intersects a reflective surface of the first capillary optic.

10. The optical apparatus of claim 9, wherein the reflective surface comprises a metal-coated reflective surface configured to reflect x-ray light having a first energy incident on the metal-coated reflective surface at a first angle, and to reflect x-ray light having a second energy incident on the metal-coated reflective surface at a second angle, different from the first angle.

11. The optical apparatus of claim 9, wherein the first capillary optic is configured to receive the x-ray light having the first beam divergence at a first grazing incidence angle and direct the x-ray light as a substantially collimated beam toward a reflective surface of the second capillary optic.

12. The optical apparatus of claim 11, wherein the second capillary optic is configured to focus the substantially collimated beam onto a sample.

13. The optical apparatus of claim 1, wherein the first capillary optic has a first entrance aperture and x-ray light within a first bandwidth enters the first capillary optic through the first entrance aperture.

14. The optical apparatus of claim 1, wherein the first focal length and the second focal length are different.

15. The optical apparatus of claim 1, wherein the second longitudinal axis is angled with respect to the first longitudinal axis by less than 1 degree.

16. The optical apparatus of claim 1, wherein the first capillary optic and the second capillary optic are mono-capillary optics.

17. The optical apparatus of claim 1, wherein at least one of the first capillary optic or the second capillary optic is a parabolic capillary optics.

18. The optical apparatus of claim 1, wherein the parabolic capillary optic comprises a portion of a surface of revolution of a parabolic curve.

19. The optical apparatus of claim 1, wherein the light is x-ray light.

* * * * *